United States Patent
Huh et al.

(10) Patent No.: US 10,747,558 B2
(45) Date of Patent: Aug. 18, 2020

(54) DYNAMIC SPLITTING ALGORITHM FOR SPLITTING A DESKTOP SCREEN INTO NON-OVERLAPPING EQUAL-SIZE BLOCKS

(71) Applicant: UNIVERSITY-INDUSTRY COOPERATION GROUP OF KYUNG HEE UNIVERSITY, Yongin-si, Gyeonggi-do (KR)

(72) Inventors: Eui Nam Huh, Yongin-si (KR); Jin-Seop Lee, Suwon-si (KR); Jun Young Park, Yongin-si (KR); MD Abu Layek, Yongin-si (KR)

(73) Assignee: UNIVERSITY-INDUSTRY COOPERATION GROUP OF KYUNG HEE UNIVERSITY, Yongin-si (KR)

( * ) Notice: Subject to any disclaimer, the term of this patent is extended or adjusted under 35 U.S.C. 154(b) by 0 days.

(21) Appl. No.: 16/432,530

(22) Filed: Jun. 5, 2019

(65) Prior Publication Data
US 2019/0286459 A1 Sep. 19, 2019

Related U.S. Application Data

(63) Continuation of application No. PCT/KR2017/010086, filed on Sep. 14, 2017.

(30) Foreign Application Priority Data

Dec. 15, 2016 (KR) .......................... 10-2016-0171831
Jul. 3, 2017 (KR) .......................... 10-2017-0084036

(51) Int. Cl.
*G06F 9/451* (2018.01)
*G09G 5/32* (2006.01)
*G06F 3/0481* (2013.01)

(52) U.S. Cl.
CPC ............ *G06F 9/451* (2018.02); *G06F 3/0481* (2013.01); *G09G 5/32* (2013.01)

(58) Field of Classification Search
CPC ............ G06F 9/451; G09G 2310/0221; G09G 3/3644
See application file for complete search history.

(56) References Cited

FOREIGN PATENT DOCUMENTS

| | | |
|---|---|---|
| JP | H05-234260 A | 9/1993 |
| JP | 2011-077628 A | 4/2011 |
| JP | 2011-081675 A | 4/2011 |
| KR | 10-2001-0026044 A | 3/2004 |
| KR | 10-2004-0026044 A | 3/2004 |

OTHER PUBLICATIONS

International Search Report issued in PCT/KR2017/010086; dated Dec. 22, 2017.
MD Abu Layek et al.; "Efficient Screen Splitting Methods—A Case Study in Block-wise Motion Detection"; KSII Transactions on Internet and Information Systems; Oct. 10, 2016; pp. 5074-5094; vol. 10, No. 10.

*Primary Examiner* — Amy Ng
*Assistant Examiner* — David Tan
(74) *Attorney, Agent, or Firm* — Studebaker & Brackett PC

(57) ABSTRACT

Screen splitting may be utilized in various applications, such as image or video compression, high efficiency video coding (HEVC), block classification of videos or images, remote desktop transfer, and the like. The methods presented herein can be applied to split an image or a desktop screen into non-overlapping blocks of equal size.

13 Claims, 10 Drawing Sheets

DYNAMIC SPLITTING ALGORITHM FOR SPLITTING A DESKTOP SCREEN INTO NON-OVERLAPPING EQUAL-SIZE BLOCKS

CROSS-REFERENCE TO RELATED APPLICATIONS

The present application is a continuation of International Patent Application No. PCT/KR2017/010086 filed on Sep. 14, 2017 which is based upon and claims the benefit of priority to Korean Patent Application No. 10-2016-0171831 filed on Dec. 15, 2016, and Korean Patent Application No. 10-2017-0084036 filed on Jul. 3, 2017. The disclosures of the above-listed applications are hereby incorporated by reference herein in their entirety.

1. TECHNICAL FIELD

The present invention relates to a dynamic splitting algorithm for splitting a desktop screen into non-overlapping blocks of equal size.

2. DESCRIPTION OF THE RELATED ART

Existing technology applies a splitting method that entails first configuring small blocks of a fixed size (16×16, 8×8, etc.). Many research efforts related to compression, classification, and screen content coding for images or videos adopt a method of dividing the screen into blocks of 8×8, 16×16, and 32×32 sizes. Likewise, virtual desktop protocols or camera applications also require splitting. In addition, certain research efforts pertaining to remote desktop Quality of Experience provisioning using the VNC-RFB protocol also employ splitting a screen into fixed block sizes. One advantage of splitting into the same block sizes is that the same constants and formulas can be used commonly in scaling or processing for all blocks.

If it were possible to dynamically adjust the sizes of the blocks according to the various circumstances of the image shown on the screen, such a method would allow more efficient image compression and processing.

SUMMARY OF THE INVENTION

To resolve the problem described above, an aspect of the present invention proposes algorithms for dynamic screen splitting.

A first algorithm is an algorithm for splitting into blocks shaped as the largest possible square that does not result in overlapping.

A second algorithm is also an algorithm for splitting into squares.

Screen splitting may be utilized in various applications, such as image or video compression, high efficiency video coding (HEVC), block classification of videos or images, remote desktop transfer, and the like. The methods presented herein can be applied to split an image or a desktop screen into non-overlapping blocks of equal size.

A dynamic splitting method for splitting a desktop screen into non-overlapping blocks of equal size, according to one aspect of the invention, can include: an input information reception procedure of receiving input information pertaining to the screen height (SH: ScreenHeight) and the screen width (SW: ScreenWidth) of a screen; a greatest common divisor computation procedure of computing the greatest common divisor (GCD) of the screen height (SH) and the screen width (SW); and a block size determination procedure of determining block numbers (RecH: RecHeight, RecW: RecWidth) in the height direction and width direction of the screen by splitting the width and height of the screen into blocks having a size smaller than the GCD. The dynamic splitting method can increase the efficiency of image processing by finding the optimal splitting for a particular application and can be performed automatically in accordance with the relevant circumstances.

An embodiment of the invention can further include a first pixel information matrix generation procedure of generating a first pixel information matrix, which may be a pixel information matrix pertaining to each of the blocks split according to the block numbers. Here, the pixel information matrix pertaining to each of the blocks can be determined as:

$$RM = \begin{bmatrix} B_{11} & B_{12} & \ldots & \ldots & B_{1RecW} \\ B_{21} & B_{22} & \ldots & \ldots & B_{2RecW} \\ \ldots & \ldots & \ldots & \ldots & \ldots \\ \ldots & \ldots & \ldots & \ldots & \ldots \\ B_{RecH1} & \ldots & \ldots & \ldots & B_{RecHRecW} \end{bmatrix}.$$

An embodiment of the invention can further include a second pixel information matrix generation procedure of generating a second pixel information matrix, which may be a pixel information matrix pertaining to pixels within each of the blocks. Here, a k-th block of an n-th row can be expressed as $B_{nk}$, and the second pixel information matrix $BM_{nk}$ for the $B_{nk}$ can be determined as:

$$BM_{nk} = \begin{bmatrix} P[(n-1)*BH+1][(k-1)*BW+1] & P[(n-1)*BH+1][(k-1)*BW+2] & \ldots & \ldots & P[(n-1)*BH+1][(k-1)*BW+BW] \\ P[(n-1)*BH+2][(k-1)*BW+1] & P[(n-1)*BH+2][(k-1)*BW+2] & \ldots & \ldots & P[(n-1)*BH+2][(k-1)*BW+BW] \\ \ldots & \ldots & \ldots & \ldots \\ \ldots & \ldots & \ldots & \ldots \\ P[(n-1)*BH+BH][(k-1)*BW+1] & P[(n-1)*BH+BH][(k-1)*BW+2] & \ldots & \ldots & P[(n-1)*BH+BH][(k-1)*BW+BW] \end{bmatrix}$$

An embodiment of the invention can further include an image processing procedure of applying an operation of a different constant or a different matrix on the first pixel information matrix for scaling or processing for each of the split blocks and applying an operation of a same constant or a same matrix on the second pixel information matrix for scaling or processing for pixels within each of the blocks. Also, an image display procedure of displaying an image containing a pixel scaled or processed by the first and second pixel information matrices having the same or different constant or matrix operation applied thereto can further be included.

A dynamic splitting method for splitting a desktop screen into non-overlapping blocks of equal size, according to another aspect of the invention, may include: an input information reception procedure of receiving input information pertaining to the screen height (SH: ScreenHeight) and screen width (SW: ScreenWidth) of a screen; a greatest common divisor and divisors computation procedure of computing the greatest common divisor (GCD) of the screen height (SH) and the screen width (SW) and computing divisors (GCDdivs) of the GCD; and a block size determination procedure of determining block numbers (RecH: RecHeight, RecW: RecWidth) in the height direction and width direction of the screen by splitting the width and height of the screen into blocks having a size equal to one of the divisors (GCDdivs).

In an embodiment of the invention, the input information reception procedure can further receive information pertaining to a maximum block number (MaxDB). The block size determination procedure can include: a first determination procedure of determining the block numbers (RecH, RecW) while incrementing an index (i) by the number of divisors (GCDdivs); a block number check procedure of checking whether or not a total block number, corresponding to a product of the block numbers (RecH, RecW), is greater than or equal to the maximum block number (MaxDB); and a second determination procedure of determining that the block numbers (RecH, RecW) determined in the first determination procedure are to be returned, if the total block number is smaller than the maximum block number (MaxDB).

In an embodiment of the invention, the input information reception procedure can further receive information pertaining to a desired block size (BS). The block size determination procedure can include: a first determination procedure of determining the block numbers (RecH, RecW) while incrementing an index (i) by a number of the divisors (GCDdivs); a block number check procedure of checking whether or not a total block number, which corresponds to a product of the block numbers (RecH, RecW), is greater than or equal to a maximum block number (MaxDB), which may be determined as ceil(SH/BS)*ceil(SW/BS), ceil( ) being a function for rounding up at the decimal point; and a second determination procedure of determining that the block numbers (RecH, RecW) determined in the first determination procedure are to be returned, if the total block number is smaller than the maximum block number (MaxDB).

In an embodiment of the invention, the block numbers (RecH, RecW) can be determined in proportion to the aspect ratio of the screen, and each of the blocks can have the form of a regular square.

A dynamic splitting method for splitting a desktop screen into non-overlapping blocks of equal size, according to still another aspect of the invention, may include: an input information reception procedure of receiving input information pertaining to the screen height (SH: ScreenHeight), screen width (SW: ScreenWidth), and first block numbers (DHeight, DWidth) or first block sizes (BH: BlockHeight, BW: BlockWidth) for a screen; a divisor computation procedure of computing divisors (WidthDivs, HeightDivs) for the screen height (SH) and the screen width (SW); a divisor search procedure of searching divisors (HeightDivs[I], WidthDivs[J]) closest to the first block numbers (DHeight, DWidth) from among the computed divisors (WidthDivs, HeightDivs); and a block size determination procedure of determining second block numbers (RecH: RecHeight, RecW: RecWidth) in the height direction and width direction of the screen by splitting the width and the height of the screen into numbers corresponding to the searched divisors (HeightDivs [I], WidthDivs [J]).

An embodiment of the invention can further include, after the divisor search procedure: a block number check procedure of checking whether or not a product of the first block numbers (DHeight, DWidth) is greater than or equal to a maximum block number (MaxDB); and an adjacent divisor selection procedure of selecting divisors (HeightDivs[I±k], WidthDivs[J±k]) adjacent to the searched divisors (HeightDivs [I], WidthDivs[J]) if the product of the first block numbers (DHeight, DWidth) is greater than or equal to the maximum block number (MaxDB). The block size determination procedure can include: determining second block numbers (RecH: RecHeight, RecW: RecWidth) in the height direction and the width direction of the screen by splitting the width and the height of the screen into numbers corresponding to the selected divisors.

In an embodiment of the invention, the input information reception procedure can include receiving information pertaining to the first block numbers (DHeight, DWidth). The maximum block number (MaxDB) can be determined as a product of the first block numbers (DHeight, DWidth).

In an embodiment of the invention, the input information reception procedure can include receiving information pertaining to the first block sizes (BH: BlockHeight, BW: BlockWidth). The first block numbers (DHeight, DWidth) can be determined as ceil(SH/BS) and ceil(SW/BS), ceil( ) being a function for rounding up at the decimal point, and the maximum block number (MaxDB) can be determined as a product of the first block numbers (DHeight, DWidth).

A dynamic splitting device for splitting a desktop screen into non-overlapping blocks of equal size, according to an aspect of the invention, may include: an interface configured to receive input information pertaining to the screen height (SH: ScreenHeight) and the screen width (SW: ScreenWidth) of a screen; and a control unit configured to compute the greatest common divisor (GCD) of the screen height (SH) and the screen width (SW) received from the interface, compute divisors (GCDdivs) of the GCD, and determine block numbers (RecH: RecHeight, RecW: RecWidth) in the height direction and width direction of the screen by splitting the width and the height of the screen into blocks having a size equal to one of the divisors (GCDdivs).

In an embodiment of the invention, the control unit can apply an operation of a different constant or a different matrix on a first pixel information matrix for scaling or processing for each of the split blocks and applies an operation of a same constant or a same matrix on a second pixel information matrix for scaling or processing for pixels within each of the blocks. The dynamic splitting device can further include a display configured to show an image containing a pixel scaled or processed by the first and second pixel information matrices to which the same or different constant or matrix operation has been applied.

In an embodiment of the invention, the interface can further receive information pertaining to a maximum block number (MaxDB). The control unit can determine the block numbers (RecH, RecW) while incrementing an index (i) by a number of the divisors (GCDdivs), check whether or not a total block number corresponding to a product of the block numbers (RecH, RecW) is greater than or equal to the maximum block number (MaxDB), and determine that the block numbers (RecH, RecW) determined above are to be returned if the total block number is smaller than the maximum block number (MaxDB).

In an embodiment of the invention, the interface can further receive information pertaining to a desired block size (BS). The control unit can determine the block numbers (RecH, RecW) while incrementing an index (i) by a number of the divisors (GCDdivs) and check whether or not a total block number corresponding to a product of the block numbers (RecH, RecW) is greater than or equal to a maximum block number (MaxDB), where the maximum block number (MaxDB) may be determined as ceil(SH/BS)*ceil(SW/BS) with ceil( ) being a function for rounding up at the decimal point, and if the total block number is smaller than the maximum block number (MaxDB), the control unit can determine that the block numbers (RecH, RecW) determined above are to be returned.

A dynamic splitting device for splitting a desktop screen into non-overlapping blocks of equal size, according to another aspect of the invention, may include: an interface configured to receive input information pertaining to the screen height (SH: ScreenHeight), screen width (SW: ScreenWidth), and first block numbers (DHeight, DWidth) or first block sizes (BH: BlockHeight, BW: BlockWidth) for a screen; and a control unit configured to compute divisors (WidthDivs, HeightDivs) for the screen height (SH) and the screen width (SW) received from the interface, search divisors (HeightDivs[I], WidthDivs[J]) closest to the first block numbers (DHeight, DWidth) from among the computed divisors (WidthDivs, HeightDivs), and determine second block numbers (RecH: RecHeight, RecW: RecWidth) in the height direction and width direction of the screen by splitting the width and the height of the screen into numbers corresponding to the searched divisors (HeightDivs[I], WidthDivs[J]).

In an embodiment of the invention, the control unit can check whether or not a product of the first block numbers (DHeight, DWidth) is greater than or equal to a maximum block number (MaxDB), and if the product of the first block numbers (DHeight, DWidth) is greater than or equal to the maximum block number (MaxDB), can determine second block numbers (RecH: RecHeight, RecW: RecWidth) in the height direction and width direction of the screen by selecting divisors (HeightDivs[I±k], WidthDivs[J±k]) adjacent to the searched divisors (HeightDivs[I], WidthDivs[J]) and splitting the width and the height of the screen into numbers corresponding to the selected divisors.

In an embodiment of the invention, the interface can receive information pertaining to the first block numbers (DHeight, DWidth). The control unit can determine the maximum block number (MaxDB) as a product of the first block numbers (DHeight, DWidth).

In an embodiment of the invention, the interface can receive information pertaining to the first block sizes (BH: BlockHeight, BW: BlockWidth). The control unit can determine the first block numbers (DHeight, DWidth) as ceil(SH/BS) and ceil(SW/BS) and can determine the maximum block number (MaxDB) as a product of the first block numbers (DHeight, DWidth).

A dynamic splitting algorithm for splitting a desktop screen into non-overlapping blocks of equal size, based on an embodiment of the invention, can increase the efficiency of image processing by finding the optimal splitting for a particular application and can be performed automatically in accordance with the relevant circumstances.

DETAILED DESCRIPTION OF THE INVENTION

Figure 1:
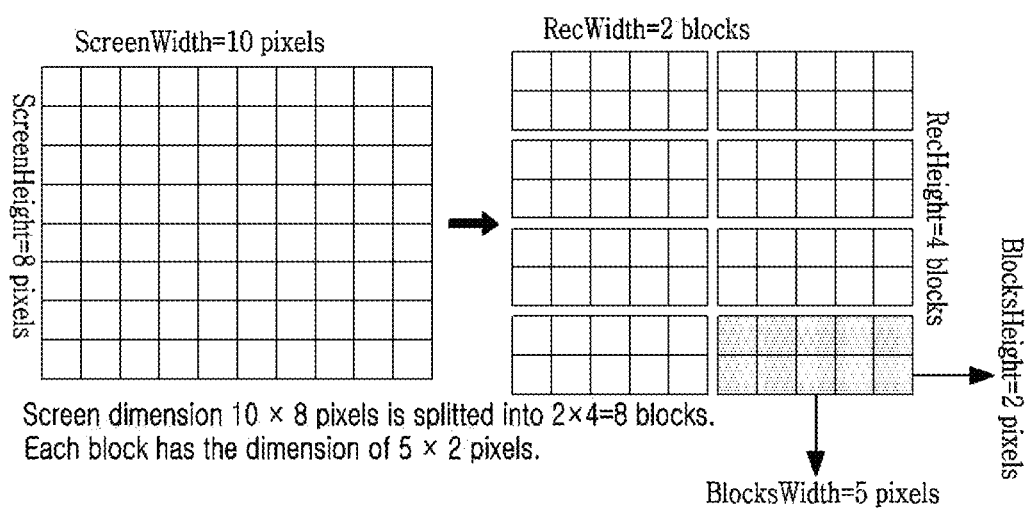
FIG. 1 shows an example of screen splitting.

The features and effects of the present invention will be more readily apparent from the detailed descriptions below provided in conjunction with the accompanying drawings, allowing the person of ordinary skill in the field of art to which the present invention pertains to readily practice the technical spirit of the invention. As the invention allows for various changes and numerous embodiments, particular embodiments will be illustrated in the drawings and described in detail in the written text. However, this is not to limit the present invention to particular modes of practice, and it is to be appreciated that all changes, equivalents, and substitutes that do not depart from the spirit and technical scope of the present invention are encompassed in the present invention. The terms used in the specification are used merely for explaining specific embodiments and are not intended to limit the present invention.

In describing the drawings, similar reference numerals are designated to similar elements.

While such terms as "first" and "second," etc., may be used to describe various components, such components must not be limited to the above terms. The above terms are used only to distinguish one component from another.

For example, a first component may be referred to as a second component without departing from the scope of rights of the present invention, and likewise a second component may be referred to as a first component. The term "and/or" encompasses both combinations of the multiple number of related items disclosed and any item from among the multiple related items disclosed.

Unless otherwise defined, all terms used herein, including technical or scientific terms, have the same meanings as those generally understood by the person having ordinary skill in the field of art to which the present invention pertains.

Such terms as those defined in a generally used dictionary are to be interpreted to have the meanings equal to the contextual meanings in the relevant field of art, and are not to be interpreted to have ideal or excessively formal meanings unless clearly defined in the present specification.

The terms "module," "block," and "part," used in the descriptions below to denote certain components, may be assigned and/or interchanged for the sake of convenience in presenting the written description, and one such term does not in itself signify a particular meaning or function.

Certain preferred embodiments of the present invention are described below with reference to the accompanying drawings to allow the person having ordinary skill in the art to readily practice the invention. In describing the embodiments of the present invention, certain detailed explanations of the related art are omitted when it is deemed that they may unnecessarily obscure the essence of the invention.

A method and device for the dynamic splitting of a desktop screen into non-overlapping blocks of equal size according to certain embodiments of the invention are disclosed below. First, a description is provided of the concept of screen splitting, as referred to in regard to the dynamic splitting method and device based on embodiments of the invention.

Screen Splitting

As mentioned above, it may be needed to split a screen image, video clip, or a desktop screen into non-overlapping blocks of equal size. If the area of a screen is ScreenWidth (SW)×ScreenHeight(SH), the splitting processing may provide splitting into a RecWidth×RecHeight number of outer rectangles.

In the relationship between the rectangles and blocks, the area of the original screen may be obtained as:
ScreenWidth=BlockWidth*RecWidth,
ScreenHeight=BlockHeight*RecHeight.

FIG. 1 shows an example of screen splitting. The mathematical analysis related to the screen splitting illustrated in FIG. 1 may be as follows.

Mathematical Analysis

Supposing that the area of the screen is SW×SH, the width of the screen is SW, and the height is SH, then a pixel information matrix FM of the screen may be expressed as Equation 1.

$$FM = \begin{bmatrix} P_{11} & P_{12} & \ldots & \ldots & P_{1SW} \\ P_{21} & P_{22} & \ldots & \ldots & P_{2SW} \\ \ldots & \ldots & \ldots & \ldots & \ldots \\ \ldots & \ldots & \ldots & \ldots & \ldots \\ P_{SH1} & \ldots & \ldots & \ldots & P_{SHSW} \end{bmatrix} \quad \text{[Equation 1]}$$

If the screen is to be split into non-overlapping blocks (the size of which is expressed as BW×BH), then the width and the height of the blocks must divide the width and height of the screen leaving no remainders. This can be expressed in mathematical form as Equation 2.

$$BH|SH \text{ and } BW|SW \quad \text{[Equation 2]}$$

Also, the numbers of blocks in the height direction and width direction after the splitting can be expressed as Equation 3 and Equation 4.

$$RecH = \frac{SH}{BH} \quad \text{[Equation 3]}$$

$$RecW = \frac{SW}{BW} \quad \text{[Equation 4]}$$

Therefore, the total number of blocks generated may be as Equation 5.

$$TB = RecH * RecW \quad \text{[Equation 5]}$$

The blocks generated here can be expressed as a matrix RM as shown in Equation 6.

$$RM = \begin{bmatrix} B_{11} & B_{12} & \ldots & \ldots & B_{1RecW} \\ B_{21} & B_{22} & \ldots & \ldots & B_{2RecW} \\ \ldots & \ldots & \ldots & \ldots & \ldots \\ \ldots & \ldots & \ldots & \ldots & \ldots \\ B_{RecH1} & \ldots & \ldots & \ldots & B_{RecHRecW} \end{bmatrix} \quad \text{[Equation 6]}$$

The elements $B_{xx}$ of the rectangular matrix represent blocks generated as a result of the splitting. The k-th block of the n-th row may be expressed as $B_{nk}$, and the pixel data of the screen for this block can be provided in the form of a matrix as shown in Equation 7.

$$BM_{nk} = \begin{bmatrix} P_{[(n-1)*BH+1]}^{[(k-1)*BW+1]} & P_{[(n-1)*BH+1]}^{[(k-1)*BW+2]} & \ldots & \ldots & P_{[(n-1)*BH+1]}^{[(k-1)*BW+BW]} \\ P_{[(n-1)*BH+2]}^{[(k-1)*BW+1]} & P_{[(n-1)*BH+2]}^{[(k-1)*BW+2]} & \ldots & \ldots & P_{[(n-1)*BH+2]}^{[(k-1)*BW+BW]} \\ \ldots & \ldots & \ldots & \ldots & \ldots \\ \ldots & \ldots & \ldots & \ldots & \ldots \\ P_{[(n-1)*BH+BH]}^{[(k-1)*BW+1]} & P_{[(n-1)*BH+BH]}^{[(k-1)*BW+2]} & \ldots & \ldots & P_{[(n-1)*BH+BH]}^{[(k-1)*BW+BW]} \end{bmatrix} \quad \text{[Equation 7]}$$

An example for $B_{11}$ is shown in Equation 8.

$$BM_{11} = \begin{bmatrix} P_{11} & P_{12} & \ldots & \ldots & P_{1BW} \\ P_{21} & P_{22} & \ldots & \ldots & P_{2BW} \\ \ldots & \ldots & \ldots & \ldots & \ldots \\ \ldots & \ldots & \ldots & \ldots & \ldots \\ P_{BH1} & \ldots & \ldots & \ldots & P_{BHBW} \end{bmatrix} \quad \text{[Equation 8]}$$

In mathematics, the greatest common divisor of two or more integers is the largest positive integer that divides each of the integers without leaving remainders. If the greatest common divisor is expressed as GCD, then the largest possible block that can be generated from a set of the divisors of the width and height of the screen SW and SH would have a size of GCD×GCD.

Combined with Equation 2, this can be expressed as Equation 9 below.

$$GCD|SH \text{ and } GCD|SW \quad \text{[Equation 9]}$$

Also, from BW=BH=GCD, Equations 3 and 4 can be expressed as Equations 10 and 11 shown below.

$$RecH = \frac{SH}{BH} = \frac{SH}{GCD} \quad \text{[Equation 10]}$$

$$RecW = \frac{SW}{BW} = \frac{SW}{GCD} \quad \text{[Equation 11]}$$

By using Equations 10 and 11, the ratio between the horizontal number and vertical number of blocks can be expressed as Equation 12.

$$\frac{RecH}{RecW} = \frac{SH/GCD}{SW/GCD} = \frac{SH}{SW}$$ [Equation 12]

Thus, as shown in Equation 12, the aspect ratio of the block numbers is the same as the aspect ratio of the screen size.

To split the screen into equal-size blocks without overlapping, the greatest common divisor of the width and the height of the screen must be found. As shown in Equation 13, the vector GCDdivs includes all divisors from 1 to GCD.

GCDdivs=divisors(GCD)=$[d_1,d_2, \ldots ,d_n]$ [Equation 13]

Here, d1=1 and dn=GCD.

According to the definition of the GCD, all divisors $d_i$ included in GCDdivs can divide both the width and the height of the screen without leaving remainders. This is as expressed in Equation 14.

$di|SH$ and $di|SW$ [Equation 14]

According to Equation 14, it can again be shown that the ratio between the block numbers in the width and height directions maintains the aspect ratio of the original screen, as expressed below in Equation 15.

$$\frac{RecH}{RecW} = \frac{SH/d_i}{SW/d_i} = \frac{SH}{SW}$$ [Equation 15]

MaxDB represents the maximum range of block numbers desired by the user, and as such, the splitting must satisfy Equation 16.

TB<=MaxDB [Equation 16]

TB represents the total number of blocks generated as a result of the splitting and must have the value closest to MaxDB.

For another splitting method, the desired number of blocks (DWidth and DHeight) in the width direction and height direction may be determined. In this case, the generated blocks may not be in the shape of a regular square, as expressed in Equation 17.

Max$DB$=$D$Height*$D$Width [Equation 17]

The divisor vectors for SH and SW can be represented as HeightDivs, as in Equation 18, and WidthDivs, as in Equation 19, and may be defined as shown below in Equations 18 and 19.

HeightDivs=$[Hd_1,Hd_2, \ldots ,Hd_n]$ [Equation 18]

WidthDivs=$[Wd_1,Wd_2, \ldots ,Wd_n]$ [Equation 19]

Here, $Hd_1$=$Wd_1$=1, $Hd_n$=SH, and $Wd_n$=SW.

Here, the total number of possible splitting methods would be Length(WidthDivs)*Length(HeightDivs).

With respect to all pairs of block numbers (DHeight, DWidth) in the height and width directions, it is necessary to find the pairs that satisfy Equation 17 in accordance with the definitions shown below in Equations 20 to 24.

$I$=Loc[min{abs($Hd_i$−DHeight)}] [Equation 20]

$J$=Loc[min{abs($Wd_i$−DWidth)}] [Equation 21]

Rec$H_i$=HeightDivs($I$) [Equation 22]

Rec$W_j$=WidthDivs($J$) [Equation 23]

TB$_1$=Rec$H_i$*Rec$W_j$ [Equation 24]

However, it is not readily known whether or not a found pair is the optimal pair satisfying the equations. Thus, the block numbers may be calculated using neighboring values of the found pair.

TB$_2$=Rec$H_{i-1}$*Rec$W_j$ [Equation 25]

TB$_3$=Rec$H_i$*Rec$W_{j-1}$ [Equation 26]

TB$_4$=Rec$H_{i+1}$*Rec$W_j$ [Equation 27]

TB$_5$=Rec$H_i$*Rec$W_{j+1}$ [Equation 28]

TB$_6$=Rec$H_{i-1}$*Rec$W_{j-1}$ [Equation 29]

Then, when a $TB_i$ value closest to but not exceeding MaxDB is found, the corresponding area of the rectangle may be determined.

Splitting Algorithms

In this section, the screen splitting is implemented in the form of algorithms. The 'flower.jpg' image file used here as an example has a size of 240×160.

(http://layek.itrrc.com/files/flower.jpg)

The splitting may provide various selections such as in terms of block numbers, block sizes, shape of the quadrilateral, and the like. If a rectangle is selected, another selection may be queried as regards what the aspect ratio of the outer rectangle should be.

Figure 2A:
FIG. 2A and FIG. 2B illustrate blocks generated to have the same aspect ratio by way of an RM matrix.
Figure 2B:
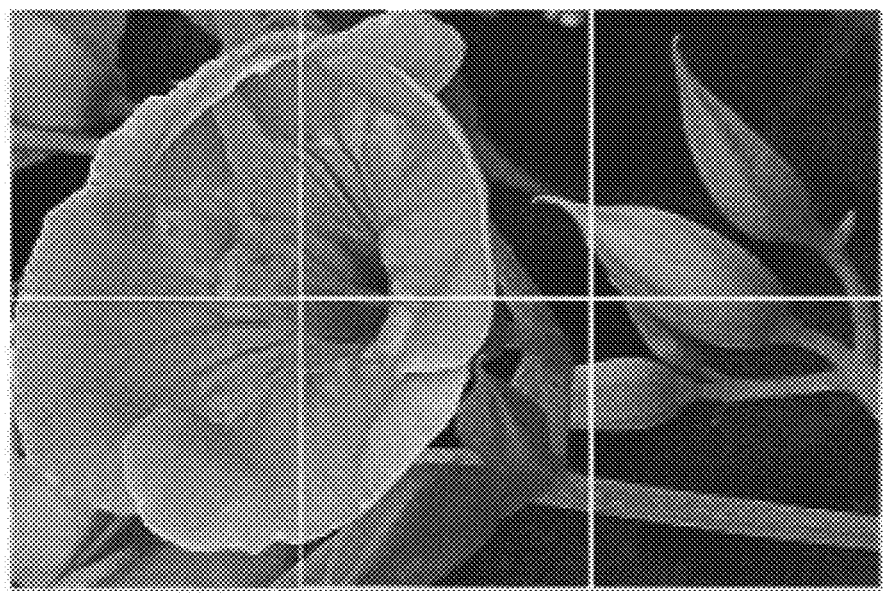

As a simple example, suppose that only two pieces of information are selected, width and height. The example file has a ratio of 3:2, and the splitting can be performed into 3*2=6 blocks. Here, the RM matrix may also have the same aspect ratio, and the generated blocks may be squares having a size of 80×80, as shown in FIG. 2A and FIG. 2B. That is, FIG. 2A and FIG. 2B illustrate blocks that have been generated to have the same aspect ratio as the screen according to an embodiment of the invention.

Algorithm 1 is an algorithm for splitting a screen into square blocks of the largest possible size while maintaining the aspect ratio of the screen. Equations 1 to 8 presented above define general parameters for mathematical analysis. Next, the GCD with which to divide the screen size without leaving remainders may be obtained by way of Equations 9 to 12. Then, to obtain the largest square blocks, the GCD obtained above may be used as the size of the blocks, and the number of blocks (RecHeight, RecWidth) in the width and height directions may be calculated accordingly.

In the algorithm, variable GCD represents the greatest common divisor of the screen width and height. In the example, the GCD is gcd(240, 160)=80.

As an exceptional case, if the GCD of the width and height is 1, there is no splitting.

In certain cases, it may occur that square blocks of a smaller size are selected, for example a 40×40 block size (RecWidth=6, RecHeight=4, TB=24), a 20×20 block size (RecWidth=10, RecHeight=8, TB=96), etc.

In this method, an upper limit (MaxDB) to the number of blocks resulting from the splitting may be configured, using another parameter, the total block number (MaxNumberOfBlocks).

As an exceptional case, if the desired maximum block number (MaxDB) is greater than the largest total block number (TB), then the entire screen itself may be returned.

Figure 3A:
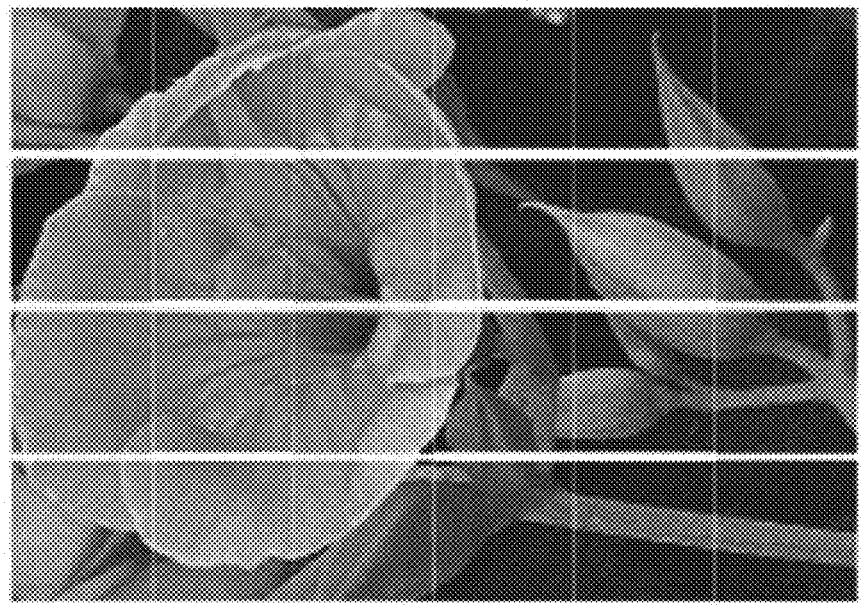
FIG. 3A and FIG. 3B illustrate ways of splitting an example image into two different numbers of blocks.
Figure 3B:

Algorithm 2 shows a detailed approach based on Equations 13 to 16. FIG. 3A and FIG. 3B show the example image split into two different block numbers. Here, it can be seen that the two splitting methods both maintain the aspect ratio of the original image at 3:2, as 240:160=3:2, 6:4=15:10=3:2. All divisors in GCDdiv can divide the width and height of the screen for splitting into square blocks. That is, FIG. 3A and FIG. 3B illustrate ways of splitting an example image into two different numbers of blocks according to an embodiment of the invention.

If the requested number of square blocks is increased, the splitting would mean dividing into blocks of a smaller size. Here, the splitting should provide dividing into a number of blocks that does not exceed the maximum block number (MaxDB), as represented in step 6. The final step of the algorithm is to process the exceptional case of when the GCD is 1.

The two methods described above provide blocks of square shapes with which the aspect ratio of the screen may be maintained. In the given example, a square splitting of the image can be performed, where the possible numbers of blocks may include: 6 (3×2), 24 (6×4), 96 (12×8), 150 (15×10), 384 (24×16), 600 (30×20), 1536 (48×32), 2400 (60×40), 9600 (120×80), and 38400 (240×160).

Figure 4:
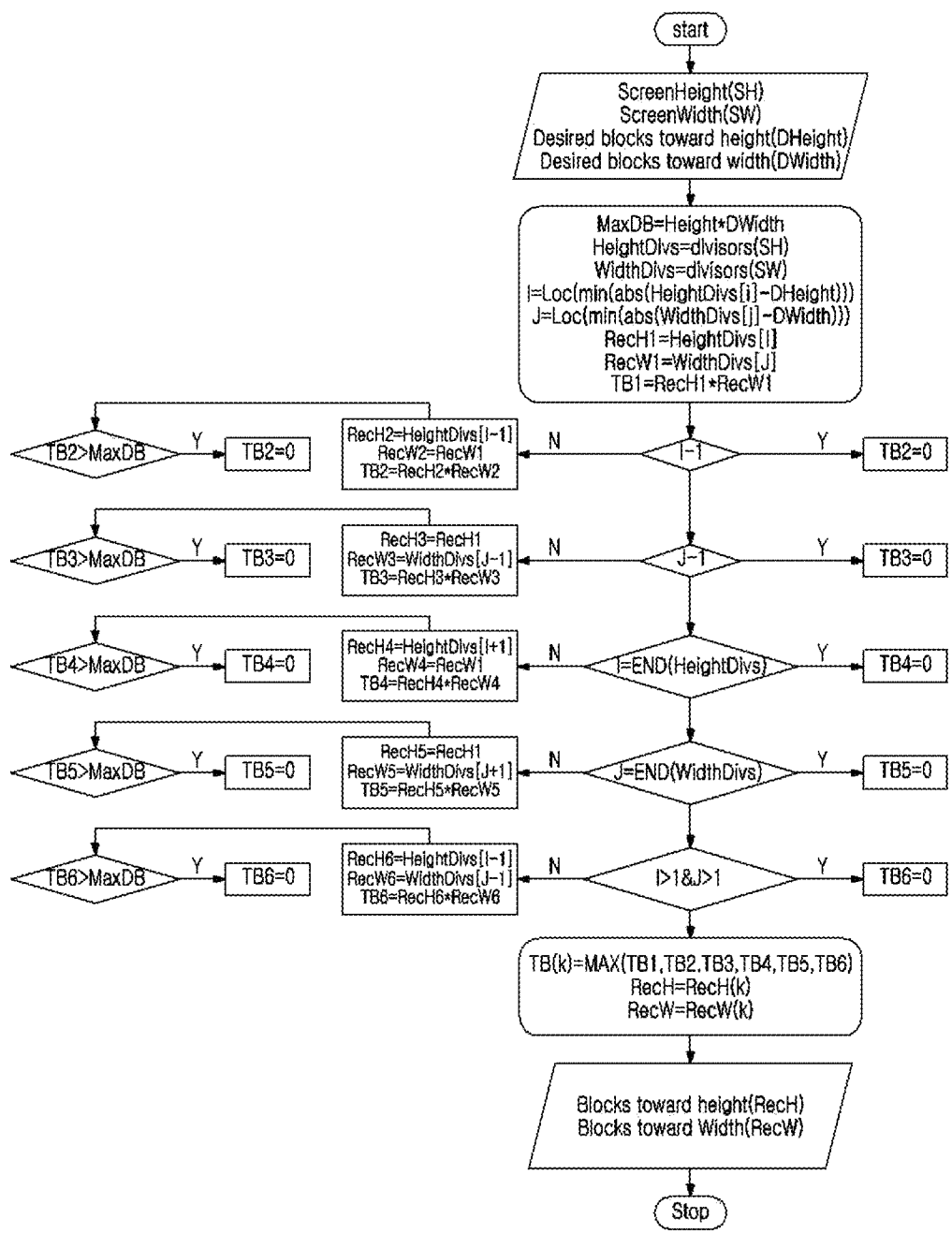
FIG. 4 is a detailed flow diagram illustrating an embodiment of the invention.
Figure 5A:
FIG. 5A, FIG. 5B, FIG. 5C and FIG. 5D show an example image to which an embodiment of the invention is applied.
Figure 5B:
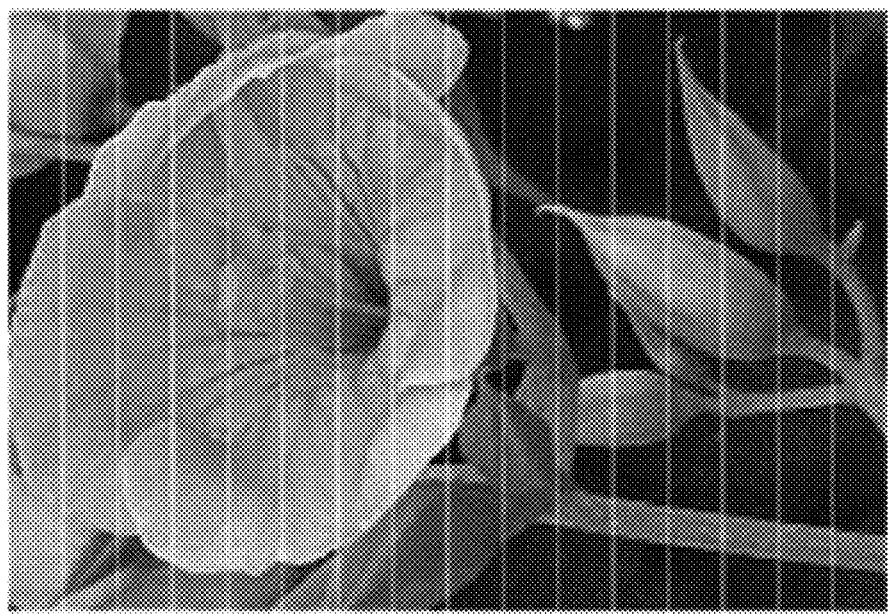
Figure 5C:
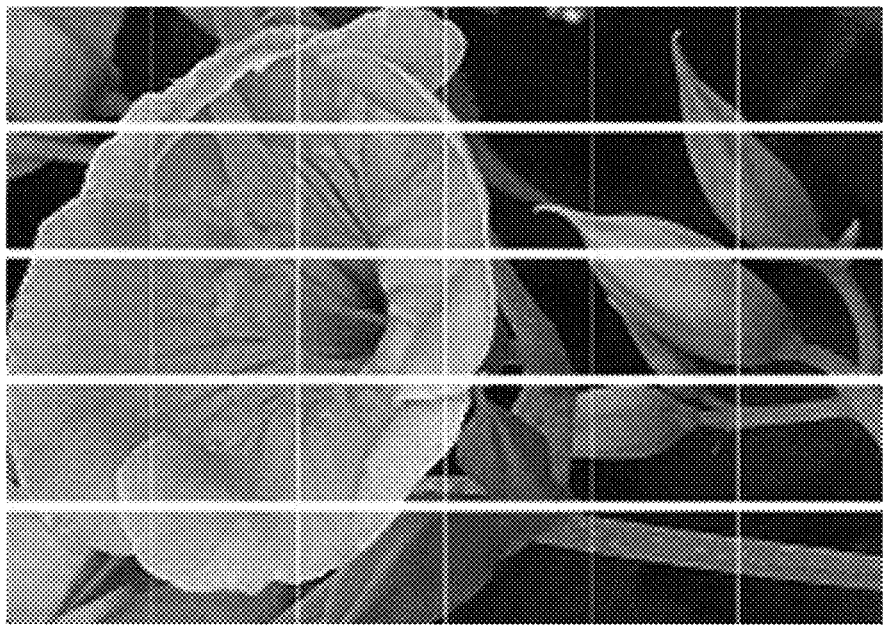
Figure 5D:
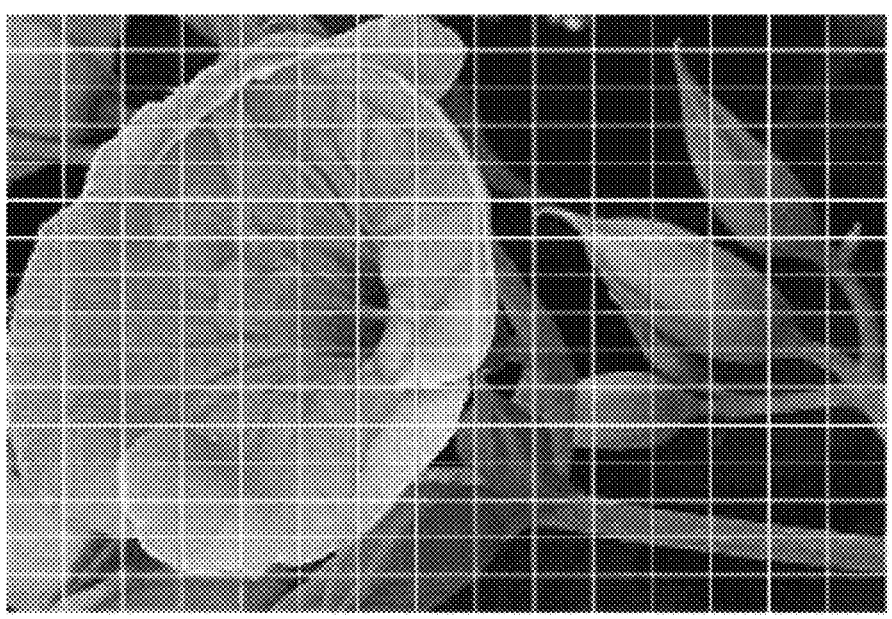

However, in some cases, the user may request splitting into shapes other than squares. As a method for handling such cases, Algorithm 3 shows a stepwise arbitrary splitting process based on the analysis of Equations 17 to 29, and a detailed flow diagram is shown in FIG. 4. That is, FIG. 4 is a detailed flow diagram illustrating an embodiment of the invention.

FIG. 5A, FIG. 5B, FIG. 5C and FIG. 5D show an example image to which an embodiment of the invention is applied.

As shown in FIG. 5A to FIG. 5D, it is possible to divide the example image into 1×16, 16×1, 5×6, and 15×16 blocks. A goal of an embodiment of the invention is to divide into blocks of equal size without overlapping in a number that is as close as possible to the boundary. For example, when dividing into 18 columns widthwise and 14 rows heightwise, the overall number of blocks would be 18×14=252. Here, 252 represents the maximum number of blocks (MaxDB). The divisor vectors are as shown in Equations 30 and 31.

WidthDivs=divisors(240)=[1,2,3,4,5,6,8,10,12,15,16, 20,24,30,40,48,60,80,120,240] [Equation 30]

HeightDivs=divisors(160)=[1,2,4,5,8,10,16,20,32,40, 80,160] [Equation 31]

In this case, the divisors closest to 18 and 14 may first be found from the vectors WidthDivs and HeightDivs. In the example, 16 may be selected for a total block number (TB) of 256 (16×16), which exceeds the maximum block number (MaxDB) of 252. Afterwards, the algorithm may check the divisor vectors for pairs of nearby block sizes, such as 15×10, 15×16, 15×20, 16×10, 16×20, 20×10, 20×16, and 20×20. From among the pairs above, the algorithm may select 15×16 (see FIG. 5D). Thus, 240 blocks may be generated, which does not exceed 252.

If the size of the blocks is given instead of the total number of blocks or the numbers of blocks present along the two directions, Algorithm 2 or Algorithm 3 can be used through a simple modification.

Algorithm 4 and Algorithm 5 represent the procedures referred to above.

Using desktop motion detection as a learning study and through various test evaluations, the effects of this splitting approach on classification performance were evaluated. The evaluation was performed by arranging a few dynamic/animation execution and static/document execution regions and measuring performance in different splitting environments. As a result, it can be seen that the performance is increased when the numbers of blocks are increased and when the deviations in ratio are reduced, even though the ratio is not consistent. An increase in the number of blocks may drastically increase resource consumption, but if the ratios are adjusted to maintain the same number of blocks, there would not be a large impact on system resource consumption. The splitting algorithms presented here can be applied to numerous applications and can easily be automated. A splitting method suitable for a particular scenario can be found by way of runtime verification. For example, a remote desktop provider solution can integrate dynamic splitting to enable a higher QoE.

Figure 6A:
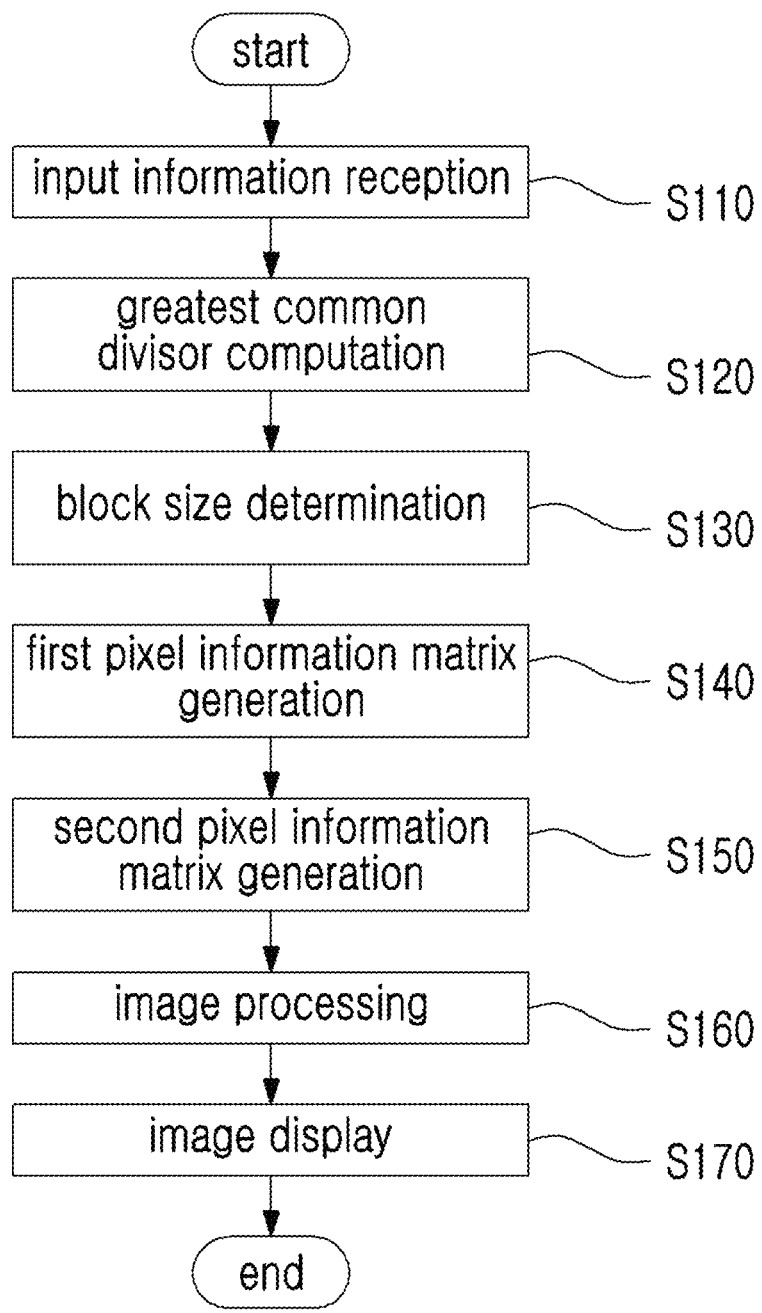
FIG. 6A is a flow diagram illustrating a dynamic splitting method according to Algorithm 1.
Figure 6B:
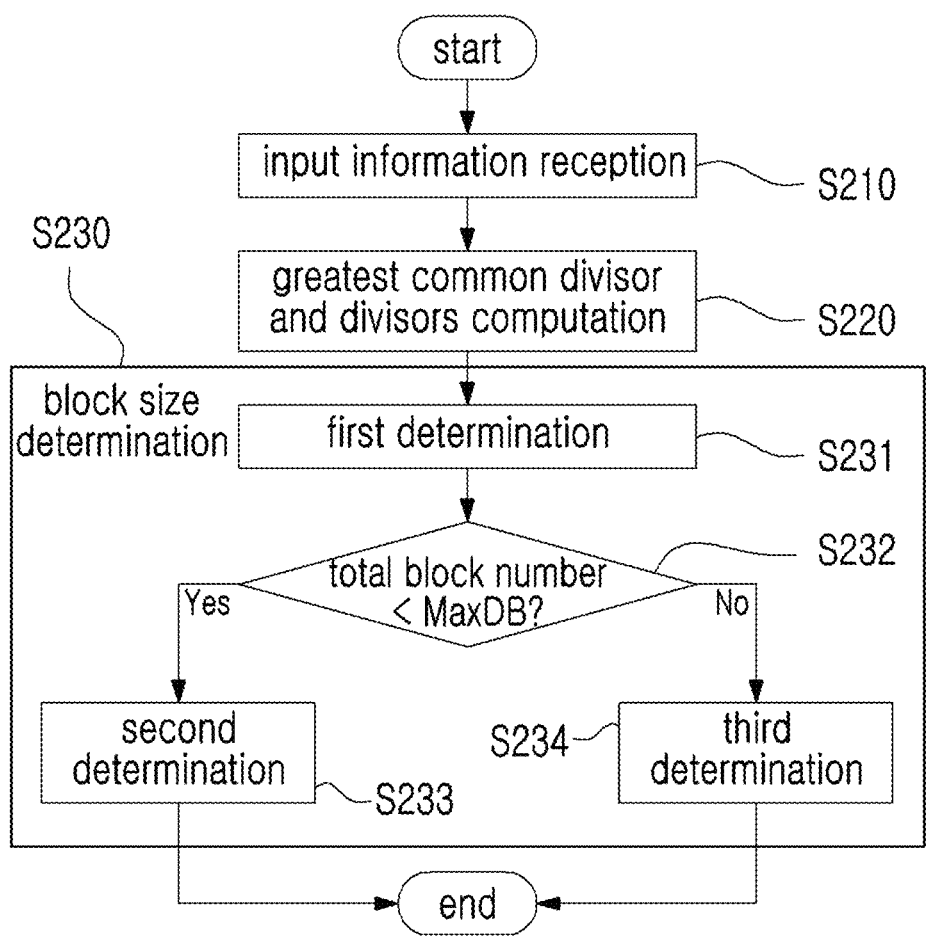
FIG. 6B is a flow diagram illustrating a dynamic splitting method according to Algorithm 2 of Algorithm 4.
Figure 6C:
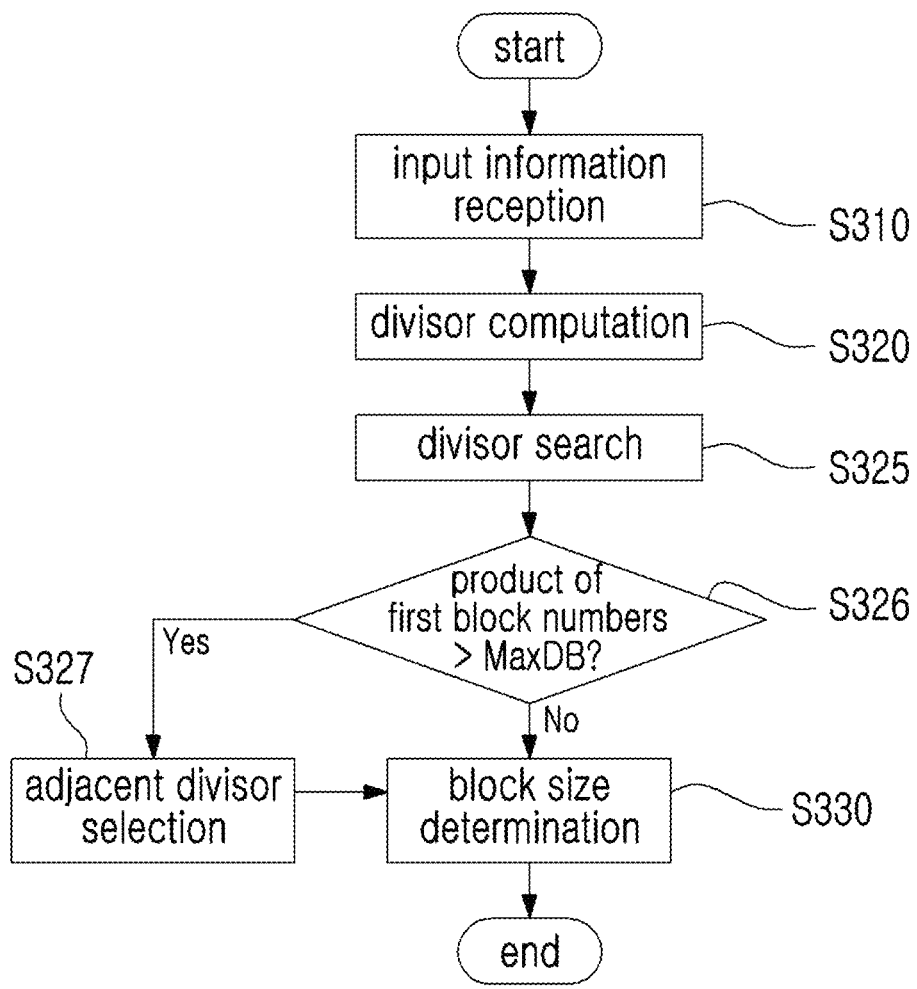
FIG. 6C is a flow diagram illustrating a dynamic splitting method according to Algorithm 3 or Algorithm 5.

FIG. 6A to FIG. 6C show flow diagrams illustrating dynamic splitting methods according to Algorithm 1 to Algorithm 5 described above. These dynamic splitting methods can be performed by a control unit of or some other component of an image processing device (or dynamic splitting device) that includes a desktop screen. For example, the dynamic splitting methods can be performed by the control unit of an image processing device.

More specifically, FIG. 6A shows a flow diagram illustrating a dynamic splitting method according to Algorithm 1. As illustrated in FIG. 6A, the dynamic splitting method according to Algorithm 1 may include an input information reception procedure S110, a greatest common divisor computation procedure S120, and a block size determination procedure S130. Also, the dynamic splitting method may further include a first pixel information matrix generation procedure S140, a second pixel information matrix generation procedure S150, an image processing procedure S160, and an image display procedure S170.

The dynamic splitting method according to Algorithm 1 may follow the algorithm represented in Table 1 below and in FIG. 1.

TABLE 1

Algorithm1: SplitAspectRatio(ScreenHeight, ScreenWidth)Input: Height and Width of the screenOutput: Number of screen blocks in height direction(RecHeight) and in width direction (RecWidth) 1: GCD=GreatestCommonDivisor(ScreenHeight, ScreenWidth)2: RecHeight = ScreenHeight/GCD 3: RecWidth = ScreenWidth/GCD First, in the input information reception procedure S110, input information pertaining to a screen height (SH: ScreenHeight) and a screen width (SW: ScreenWidth) of a screen may be received. Next, in the greatest common divisor computation procedure S120, a greatest common divisor (GCD) of the screen height (SH) and the screen width (SW) may be computed. Next, in the block size determination procedure S130, the width and height of the screen may be split into blocks having a size smaller than the GCD to determine the numbers of blocks (RecH: RecHeight, RecW: RecWidth) in the height direction and width direction of the screen.

In the first pixel information matrix generation procedure S140, a first pixel information matrix may be generated, which may be a pixel information matrix pertaining to each of the blocks split according to the block numbers. Next, in the second pixel information matrix generation procedure S150, a second pixel information matrix may be generated, which may be a pixel information matrix pertaining to the pixels within each of the blocks.

Here, the pixel information matrix for each block can be determined as Equation 6 presented above. The k-th block of the n-th row may be expressed as $B_{nk}$, and the second pixel information matrix $BM_{nk}$ for $B_{nk}$ can be determined as Equation 7 presented above.

In the image processing procedure S160, an operation of a different constant or a different matrix for scaling or processing can be applied on the first pixel information matrix for each of the split blocks. Also, in the image processing procedure S160, an operation of a same constant or a same matrix for scaling or processing can be applied on the second pixel information matrix for the pixels within each of the blocks. The procedure for applying the operation of a different constant or a different matrix and the procedure for applying the operation of a same constant or a same matrix, referred to above, can be performed independently or can be performed such that the result of one procedure is used in the other procedure. Even in cases where the procedures are performed independently, the procedures can be performed in parallel or sequentially depending on the number of processors or the processing method. Also, in the image display procedure S170, control may be provided such that an image is displayed, with the image containing pixels scaled or processed by the first and second pixel information matrices to which the same or different constant or matrix operation have been applied.

FIG. 6B is a flow diagram illustrating a dynamic splitting method according to Algorithm 2 of Algorithm 4. As illustrated in FIG. 6B, the dynamic splitting method according to Algorithm 2 or Algorithm 4 may include an input information reception procedure S210, a greatest common divisor and divisors computation procedure S220, and a block size determination procedure S230. Although it is not shown in FIG. 6B, the first pixel information matrix generation procedure S140, the second pixel information matrix generation procedure S150, the image processing procedure S160, and the image display procedure S170 from FIG. 6A can also be included.

The dynamic splitting method according to Algorithm 2 or Algorithm 4 may follow the algorithm represented in Table 2 or Table 3 below and in FIG. 2A, FIG. 2B or FIG. 4.

TABLE 2

Algorithm2: SplitAspectRatioGivenBlocks(ScreenHeight, ScreenWidth, MaxNumberOfBlocks)Input: Height and Width of the screen and the maximum number of blocksOutput: Number of screen blocks in height direction (RecHeight) and in width direction (RecWidth) 1: GCD=GreatestCommonDivisor(ScreenHeight , ScreenWidth) 2: GCDdivs=divisors(GCD) 3:for i=1:length(GCDdivs) 4: RecHeight=vidHeight/GCDdivs(i) 5: RecWidth=vidWidth/GCDdivs(i) 6:if (MaxNumberOfBlocks>=RecHeight*RecWidth) 7:return 8:endif 9:end of step 3 loop10: RecHeight=RecWidth= 1

TABLE 3

Algorithm4: SplitAspectRatioGivenBlocks(ScreenHeight, ScreenWidth, BS)Input: Height and Width of the screen and the Desired Block DimensionOutput: Number of screen blocks in height direction (RecHeight) and in width direction (RecWidth) 1: MaxNumberOfBlocks= ceil(ScreenHeight/BS)*ceil( ScreenWidth/BS)2: GCD=GreatestCommonDivisor(ScreenHeight, ScreenWidth) 3: GCDdivs=divisors(GCD) 4:for i=1:length(GCDdivs) 5: RecHeight=vidHeight/GCDdivs(i) 6: RecWidth=vidWidth/GCDdivs(i) 7:if (MaxNumberOfBlocks>=RecHeight*RecWidth) 8:return 9:endif10:end of step 3 loop 11: RecHeight=RecWidth= 1

First, in the input information reception procedure S210, input information pertaining to a screen height (SH: ScreenHeight) and a screen width (SW: ScreenWidth) of a screen may be received. According to Algorithm 2, information pertaining to a maximum number of blocks (MaxDB) can also be received in the input information reception procedure S210, as illustrated in Table 2. Also, according to Algorithm 4, information pertaining to a desired block size (BS) can also be received in the input information reception procedure S210, as illustrated in Table 3.

Next, in the greatest common divisor and divisors computation procedure S220, the greatest common divisor (GCD) of the screen height (SH) and the screen width (SW) as well as the divisors (GCDdivs) of the GCD may be computed. Next, in the block size determination procedure S230, the width and height of the screen may be split into blocks having a size equal to one of the divisors (GCDdivs), to determine the numbers of blocks (RecH: RecHeight, RecW: RecWidth) in the height direction and width direction of the screen.

The block size determination procedure S230 can further include a first determination procedure S231, a block number check procedure S232, a second determination procedure S233, and a third determination procedure S234. Referring to Table 2 for a description of Algorithm 2, in the first determination procedure S231, the block numbers (RecH, RecW) can be determined while incrementing an index (i) by the number of divisors (GCDdivs). Also, in the block number check procedure S232, it can be checked whether or not a total block number, corresponding to a product of the block numbers (RecH, RecW), is greater than or equal to the maximum block number (MaxDB). Also, in the second determination procedure S233, if the total block number is smaller than the maximum block number (MaxDB), then it can be determined that the block numbers (RecH, RecW) determined in the first determination procedure S231 are to be returned. In the third determination procedure S234, if the total block number is greater than or equal to the maximum block number (MaxDB), then it can be determined that arbitrary block numbers are to be returned. Here, the arbitrary block numbers can be determined to be RecH=1 and RecW=1, to yield the whole screen that has not been split.

Referring to Table 3 for a description of Algorithm 4, in the first determination procedure S231, the numbers of blocks (RecH, RecW) can be determined while incrementing an index (i) by the number of divisors (GCDdivs). Also, in the block number check procedure S232, it can be checked whether or not a total block number, corresponding to a product of the block numbers (RecH, RecW), is greater than or equal to the maximum block number (MaxDB). Here, the maximum block number (MaxDB) can be determined as ceil(SH/BS)*ceil(SW/BS), where ceil( ) can be a function for rounding up at the decimal point. Also, in the second determination procedure S233, if the total block number is smaller than the maximum block number (MaxDB), then it can be determined that the block numbers (RecH, RecW) determined in the first determination procedure S231 are to be returned. In the third determination procedure S234, if the total block number is greater than or equal to the maximum block number (MaxDB), then it can be determined that arbitrary block numbers are to be returned. Here, the arbitrary block numbers can be determined to be RecH=1 and RecW=1, to yield the whole screen that has not been split.

In Algorithm 2 or Algorithm 4, it is possible to determine the block numbers (RecH, RecW) to be in proportion to the aspect ratio of the screen, with the shape of each of the blocks having a square form.

FIG. 6C is a flow diagram illustrating a dynamic splitting method according to Algorithm 3 or Algorithm 5. As illustrated in FIG. 6C, the dynamic splitting method according to Algorithm 3 or Algorithm 5 may include an input information reception procedure S310, a divisor computation procedure S320, a divisor search procedure S325, and a block size determination procedure S330. Although it is not shown in FIG. 6C, the first pixel information matrix generation procedure S140, the second pixel information matrix generation procedure S150, the image processing procedure S160, and the image display procedure S170 from FIG. 6A can also be included.

The dynamic splitting method according to Algorithm 3 or Algorithm 5 may follow the algorithm represented in Table 4 or Table 5 below and in FIG. 3A, FIG. 3B or FIG. 5.

TABLE 4

Algorithm3: SplitArbitrary (ScreenHeight, ScreenWidth , DHeight , DWidth)Input: Height and Width of the screen, Number of desired blocks toward height and width Output: Number of screen blocks in height direction (RecH) and in width direction (RecW) 1. MaxDB= DHeight * DWidth 2. HeightDivs=divisors(ScreenHeight) 3. WidthDivs=divisors(ScreenWidth) 4. Find the divisor HeightDivs[I] in HeightDivs vector which is closest to DHeight 5. Find the divisor WidthDivs[J] in WidthDivs vector which is closest to DWidth 6. Calculate the Total Blocks, TB=HeightDivs[I]*WidthDivs[J], then replace the values of I,J with the pairs (I−1,J), (I,J−1), (I+1,J), (I,J+1), (I−1,J−1) and compute the corresponding TBs. Discard the values where any of the elements in the pair does not exist. 7. Finally, find the TB that is closest to but does not exceed MaxNumberOfBlocks and select the corresponding height and width divisor as the values of RecH and RecW.

TABLE 5

Algorithm5: SplitArbitraryGivenBlocksDimension (ScreenHeight, ScreenWidth , BH , BW)Input: Height and Width of the screen, desired Blocks Height and Width Output: Number of screen blocks in height direction (RecH) and in width direction (RecW) 1. DHeight=ceil(ScreenHeight/BH) 2. DWidth=ceil(ScreenHeight/BW)3. MaxDB= DHeight * DWidth 4. HeightDivs=divisors(ScreenHeight) 5. WidthDivs=divisors(ScreenWidth) 6. Find the divisor HeightDivs[I] in HeightDivs vector which is closest to DHeight 7. Find the divisor WidthDivs[J] in WidthDivs vector which is closest to DWidth 8. Calculate the Total Blocks, TB=HeightDivs[I]*WidthDivs[J], then replace the values of I,J with the pairs (I−1,J), (I,J−1), (I+1,J), (I,J+1), (I−1,J−1) and compute the corresponding TBs. Discard the values where any of the elements in the pair does not exist. 9. Finally, find the TB that is closest to but does not exceed MaxNumberOfBlocks and select the corresponding height and width divisor as the values of RecH and RecW First, in the input information reception procedure S310, input information pertaining to a screen height (SH: ScreenHeight), a screen width (SW: ScreenWidth), and first block numbers (DHeight, DWidth) or first block sizes (BH: BlockHeight, BW: BlockWidth) for a screen may be received. According to Algorithm 3, information pertaining to the screen height (SH: ScreenHeight), screen width (SW: ScreenWidth), and first block numbers (DHeight, DWidth) may be received in the input information reception procedure S310, as illustrated in Table 4. On the other hand, according to Algorithm 5, information pertaining to the screen height (SH: ScreenHeight), screen width (SW: ScreenWidth), and first block sizes (BH: BlockHeight, BW: BlockWidth) may be received in the input information reception procedure S310, as illustrated in Table 5.

Next, in the divisor computation procedure S320, the divisors (WidthDivs, HeightDivs) for the screen height (SH) and the screen width (SW) may be computed. Next, in the divisor search procedure S325, the divisors (HeightDivs[I], WidthDivs[J]) closest to the first block numbers (DHeight, DWidth) may be searched from among the computed divisors (WidthDivs, HeightDivs). Next, in the block size determination procedure S330, the width and height of the screen may be split into numbers corresponding to the searched divisors (HeightDivs[I], WidthDivs[J]), to determine second block numbers (RecH: RecHeight, RecW: RecWidth) in the height direction and width direction of the screen.

A dynamic splitting method according to Algorithm 3 or Algorithm 5 represented in Table 4 or Table 5 includes the following technical feature of checking the number of blocks, and if the maximum block number is exceeded, selecting an adjacent combination. That is, after the divisor search procedure S325, a block number check procedure S326 of checking whether or not a product of the first block numbers (DHeight, DWidth) is greater than or equal to a maximum block number (MaxDB) may additionally be included. Here, the maximum block number (MaxDB) may be determined as a product of the first block numbers (DHeight, DWidth).

Also, an adjacent divisor selection procedure S327 may additionally be included, which may include selecting divisors (HeightDivs[I±k], WidthDivs[J±k]) adjacent to the searched divisors (HeightDivs[I], WidthDivs[J]) if the product of the first block numbers (DHeight, DWidth) is greater than or equal to the maximum block number (MaxDB). For example, the adjacent divisors can have an index corresponding to any one of (I−1, J), (I, J−1), (I+1, J), (I, J+1), and (I−1, J−1). Also, in the block size determination procedure S330, the width and the height of the screen can be split into numbers corresponding to the selected divisors, to determine second block numbers (RecH: RecHeight, RecW: RecWidth) for the height direction and width direction of the screen. If the product of the first block numbers (DHeight, DWidth) is smaller than the maximum number of blocks (MaxDB) in the block number check procedure S326, the block size determination procedure S330 can be performed immediately. Otherwise, if the product of the first block numbers (DHeight, DWidth) is greater than or equal to the maximum number of blocks (MaxDB) in the block number check procedure S326, the block size determination procedure S330 can be performed after the adjacent divisor selection procedure S327.

Referring to Table 5 for a description of Algorithm 5, only the information pertaining to the first block sizes (BH: BlockHeight, BW:BlockWidth) may be received, and the information pertaining to the first block numbers (DHeight, DWidth) may not be received and instead calculated separately. Here, the first block numbers (DHeight, DWidth) may be determined as ceil(SH/BH) and ceil(SW/BW), respectively, as shown in Table 5, where ceil( ) may be a function for rounding up at the decimal point.

The foregoing describes dynamic splitting methods based on certain embodiments of the invention. In the following, a description is provided of a dynamic splitting device (or image display device) configured to perform the dynamic splitting methods. It should be appreciated that certain descriptions provided above with reference to a dynamic splitting method can be combined with descriptions provided below with reference to a dynamic splitting device.

Figure 7:
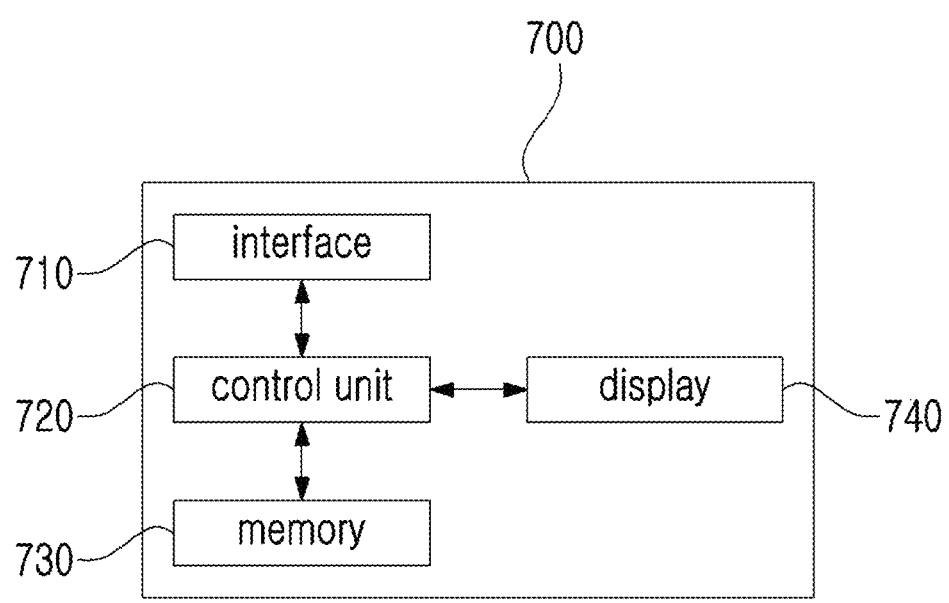
FIG. 7 illustrates the detailed composition of a dynamic splitting device (or image display device) according to an embodiment of the invention.

FIG. 7 illustrates the detailed composition of a dynamic splitting device (or image display device) according to an embodiment of the invention. Referring to FIG. 7, a dynamic splitting device (or image display device) 700 may include an interface 710, a control unit 720, a memory 730, and a display 740. Here, the interface 710 can include not only a physical interface but a virtual interface within a program (or between layers). For example, the interface 710 can be an API (application program interface), which is an interface between application programs. Here, the control unit 720 can be an arbitrary processor, can be a processor for controlling software and/or hardware, and can encompass arbitrary processors for controlling application programs as well as arbitrary program modules for performing such functions.

A dynamic splitting device (or image display device) 700 for performing a dynamic splitting method (and/or image display method) according to Algorithm 1 is described below. The interface 710 may be configured to receive input information pertaining to the screen height (SH: ScreenHeight) and the screen width (SW: ScreenWidth) of a screen. The control unit 720 may be configured to compute the greatest common divisor (GCD) of the screen height (SH) and the screen width (SW). Also, the control unit 720 can further be configured to determine the numbers of blocks (RecH: RecHeight, RecW: RecWidth) in the height direction and width direction of the screen by splitting the width and height of the screen into blocks having a size smaller than the GCD.

Also, the control unit 720 can further be configured to generate a first pixel information matrix, which may be a pixel information matrix pertaining to each of the blocks split according to the numbers of blocks. Here, the pixel information matrix for each block can be determined as Equation 6 presented above. Also, the control unit 720 can further be configured to generate a second pixel information matrix, which may be a pixel information matrix pertaining to the pixels within each of the blocks. Here, the k-th block of the n-th row may be expressed as $B_{nk}$, and the second pixel information matrix $BM_{nk}$ for $B_{nk}$ can be determined as Equation 7 presented above.

Also, the control unit 720 can further be configured to apply an operation of a different constant or a different matrix for scaling or processing on the first pixel information matrix for each of the split blocks and/or apply an operation of a same constant or a same matrix for scaling or processing on the second pixel information matrix for pixels within each of the blocks.

The memory 730 may be configured to store various data generated and/or processed by the control unit 720 and/or information pertaining to the matrices.

The display 740 may cooperate with the control unit 720 to display an image that includes pixels that have been scaled or processed by the first and second pixel information matrices to which the same or different constant or matrix operations have been applied.

Next, a dynamic splitting device (or image display device) 700 for performing a dynamic splitting method (and/or image display method) according to Algorithm 2 or Algorithm 4 is described below.

As described above, the interface 710 may be configured to receive input information pertaining to the screen height (SH: ScreenHeight) and screen width (SW: ScreenWidth) of a screen. When performing a dynamic splitting method according to Algorithm 2, the interface 710 can be configured to further receive information pertaining to the maximum number of blocks (MaxDB). On the other hand, when performing a dynamic splitting method according to Algorithm 4, the interface 710 can be configured to further receive information on the desired block size (BS).

The control unit 720 may be configured to compute the greatest common divisor (GCD) of the screen height (SH) and screen width (SW) received from the interface as well as the divisors (GCDdivs) of the GCD. Also, the control unit 720 may be configured to split the width and the height of the screen into blocks having a size equal to one of the divisors (GCDdivs), to determine block numbers (RecH: RecHeight, RecW: RecWidth) in the height direction and width direction of the screen.

Also, the control unit 720 can further be configured to apply an operation of a different constant or a different matrix on a first pixel information matrix for scaling or processing for each of the split blocks and/or apply an operation of a same constant or a same matrix on a second pixel information matrix for scaling or processing for pixels within each of the blocks. Here, the display 740 can show an image containing pixels that have been scaled or processed by the first and second pixel information matrices to which the same or different constant or matrix operation has been applied.

When performing a dynamic splitting method according to Algorithm 2, the control unit 720 can further be configured to determine the block numbers (RecH, RecW) while incrementing the index (i) by a number of the divisors (GCDdivs), check whether or not the total block number corresponding to a product of the block numbers (RecH, RecW) is greater than or equal to the maximum block number (MaxDB), and, if the total block number is smaller than the maximum block number (MaxDB), determine that the block numbers (RecH, RecW) determined above are to be returned.

When performing a dynamic splitting method according to Algorithm 4, the control unit 720 can further be configured to determine the block numbers (RecH, RecW) while incrementing the index (i) by a number of the divisors (GCDdivs), check whether or not the total block number corresponding to a product of the block numbers (RecH, RecW) is greater than or equal to a maximum block number (MaxDB), where the maximum block number (MaxDB) may be determined as ceil(SH/BS)*ceil(SW/BS) and with ceil( ) being a function for rounding up at the decimal point, and, if the total block number is smaller than the maximum block number (MaxDB), determine that the block numbers (RecH, RecW) determined above are to be returned.

Next, a dynamic splitting device (or image display device) 700 for performing a dynamic splitting method (and/or image display method) according to Algorithm 3 or Algorithm 5 is described below.

As described above, the interface 710 may be configured to receive input information pertaining to the screen height (SH: ScreenHeight) and screen width (SW: ScreenWidth) of a screen. When performing a dynamic splitting method according to Algorithm 3, the interface 710 can be configured to further receive information pertaining to first block numbers (DHeight, DWidth). On the other hand, when performing a dynamic splitting method according to Algorithm 5, the interface 710 can be configured to further receive information on first block sizes (BH: BlockHeight, BW: BlockWidth).

The control unit 720 can be configured to compute divisors (WidthDivs, HeightDivs) for the screen height (SH) and the screen width (SW) received from the interface 710. Also, the control unit 720 can further be configured to search divisors (HeightDivs[I], WidthDivs[J]) closest to the first block numbers (DHeight, DWidth) from among the computed divisors (HeightDivs, WidthDivs). Also, the control unit 720 can further be configured to split the width and height of the screen into numbers corresponding to the searched divisors (HeightDivs[I], WidthDivs[J]), to determine second block numbers (RecH: RecHeight, RecW: RecWidth) in the height direction and width direction of the screen.

Also, the control unit 720 can further be configured to check whether or not the product of the first block numbers (DHeight, DWidth) is greater than or equal to the maximum block number (MaxDB) and, if the product of the first block numbers (DHeight, DWidth) is greater than or equal to the maximum block number (MaxDB), select divisors (HeightDivs[I±k], WidthDivs[J±k]) adjacent to the searched divisors (HeightDivs[I], WidthDivs[J]). Here, the control unit can determine the maximum block number (MaxDB) as the product of the first block numbers (DHeight, DWidth). Also, the control unit 720 can further be configured to split the width and the height of the screen into numbers corresponding to the selected divisors and determine second block numbers (RecH: RecHeight, RecW: RecWidth) in the height direction and width direction of the screen.

According to Algorithm 5, when the interface 710 receives information pertaining to the first block sizes (BH: BlockHeight, BW: BlockWidth), the control unit 720 can determine the first block numbers (DHeight, DWidth) as ceil(SH/BS) and ceil(SW/BS) and determines the maximum block number (MaxDB) as a product of the first block numbers (DHeight, DWidth).

The foregoing describes a dynamic splitting method (image processing/display method) for splitting a desktop screen into non-overlapping blocks of equal size and a dynamic splitting device (image processing/display device) for performing the method. It is to be appreciated that the dynamic splitting method (image processing/display method) described above is not limited to the order in which the steps are disclosed, but rather, the order of the steps can freely be altered as necessary.

According to a dynamic splitting algorithm for splitting a desktop screen into non-overlapping blocks of equal size based on at least one embodiment of the invention, it is possible to find the optimal mode of splitting for a particular application and thus increase the efficiency of image processing, and the splitting can be applied automatically to suit the relevant circumstances.

If an embodiment of the invention is implemented by software means, the procedures and functions as well as the components described in the specification can be implemented as separate software modules. Each of the software modules can perform one or more functions and operations of described herein. The software code can be implemented as a software application written in a suitable program language. The software code can be stored in a memory and executed by a controller or processor.

What is claimed is:

1. A dynamic splitting method for splitting a desktop screen into non-overlapping blocks of equal size, the dynamic splitting method comprising:
   an input information reception procedure of receiving input information pertaining to a screen height (SH: ScreenHeight) and a screen width (SW: ScreenWidth) of a screen;
   a greatest common divisor computation procedure of computing a greatest common divisor (GCD) of the screen height (SH) and the screen width (SW);
   a block size determination procedure of determining block numbers (RecH: RecHeight, RecW: RecWidth) in a height direction and a width direction of the screen by splitting a width and a height of the screen into blocks having a size smaller than the GCD;
   a first pixel information matrix generation procedure of generating a first pixel information matrix, the first pixel information matrix being a pixel information matrix pertaining to each of the blocks split according to the block numbers,
   wherein the pixel information matrix pertaining to each of the blocks is determined as:

$$RM = \begin{bmatrix} B_{11} & B_{12} & \dots & \dots & B_{1RecW} \\ B_{21} & B_{22} & \dots & \dots & B_{2RecW} \\ \dots & \dots & \dots & \dots & \dots \\ \dots & \dots & \dots & \dots & \dots \\ B_{RecH1} & \dots & \dots & \dots & B_{RecHRecW} \end{bmatrix};$$

a second pixel information matrix generation procedure of generating a second pixel information matrix, the second pixel information matrix being a pixel information matrix pertaining to pixels within each of the blocks, wherein a k-th block of an n-th row is expressed as $B_{nk}$, and a second pixel information matrix $BM_{nk}$ for the $B_{nk}$ is determined as:

$$BM_{nk} = \begin{bmatrix} P[(n-1)*BH+1] & P[(n-1)*BH+1] & \dots & \dots & P[(n-1)*BH+1] \\ {[(k-1)*BW+1]} & {[(k-1)*BW+2]} & & & {[(k-1)*BW+BW]} \\ P[(n-1)*BH+2] & P[(n-1)*BH+2] & \dots & \dots & P[(n-1)*BH+2] \\ {[(k-1)*BW+1]} & {[(k-1)*BW+2]} & & & {[(k-1)*BW+BW]} \\ \dots & \dots & \dots & \dots & \dots \\ \dots & \dots & \dots & \dots & \dots \\ P[(n-1)*BH+ & P[(n-1)*BH+ & \dots & \dots & P[(n-1)*BH+ \\ BH] & BH] & & & BH] \\ {[(k-1)*BW+1]} & {[(k-1)*BW+2]} & & & {[(k-1)*BW+BW]} \end{bmatrix};$$

an image processing procedure of applying an operation of a different constant or a different matrix on the first pixel information matrix for scaling or processing for each of the split blocks and applying an operation of a same constant or a same matrix on the second pixel information matrix for scaling or processing for pixels within each of the blocks; and
an image display procedure of displaying an image containing a pixel scaled or processed by the first and second pixel information matrices having the same or different constant or matrix operation applied thereto.

2. A dynamic splitting method for splitting a desktop screen into non-overlapping blocks of equal size, the dynamic splitting method comprising:
   an input information reception procedure of receiving input information pertaining to a screen height (SH: ScreenHeight) and a screen width (SW: ScreenWidth) of a screen;
   a greatest common divisor and divisors computation procedure of computing a greatest common divisor (GCD) of the screen height (SH) and the screen width (SW) and computing divisors (GCDdivs) of the GCD; and a block size determination procedure of determining block numbers (RecH: RecHeight, RecW: RecWidth) in a height direction and a width direction of the screen by splitting a width and a height of the screen into blocks having a size equal to one of the divisors (GCDdivs), wherein the input information reception procedure comprises further receiving information pertaining to a maximum block number (MaxDB), and the block size determination procedure comprises:

a first determination procedure of determining the block numbers (RecH, RecW) while incrementing an index (i) by a number of the divisors (GCDdivs);

a block number check procedure of checking whether or not a total block number corresponding to a product of the block numbers (RecH, RecW) is greater than or equal to the maximum block number (MaxDB); and a second determination procedure of determining that the block numbers (RecH, RecW) determined in the first determination procedure are to be returned if the total block number is smaller than the maximum block number (MaxDB).

3. The dynamic splitting method of claim 2, wherein the input information reception procedure comprises further receiving information pertaining to a desired block size (BS), and the block size determination procedure comprises:

a first determination procedure of determining the block numbers (RecH, RecW) while incrementing an index (i) by a number of the divisors (GCDdivs);

a block number check procedure of checking whether or not a total block number corresponding to a product of the block numbers (RecH, RecW) is greater than or equal to a maximum block number (MaxDB), the maximum block number (MaxDB) determined as ceil(SH/BS)*ceil(SW/BS), ceil( ) being a function for rounding up at a decimal point; and a second determination procedure of determining that the block numbers (RecH, RecW) determined in the first determination procedure are to be returned if the total block number is smaller than the maximum block number (MaxDB).

4. The dynamic splitting method of claim 2, wherein the block numbers (RecH, RecW) are determined in proportion to an aspect ratio of the screen, and each of the blocks has a square form.

5. A dynamic splitting method for splitting a desktop screen into non-overlapping blocks of equal size, the dynamic splitting method comprising:

an input information reception procedure of receiving input information pertaining to a screen height (SH: ScreenHeight), a screen width (SW: ScreenWidth), and first block numbers (DHeight, DWidth) or first block sizes (BH: BlockHeight, BW: BlockWidth) for a screen;

a divisor computation procedure of computing divisors (WidthDivs, HeightDivs) for the screen height (SH) and the screen width (SW);

a divisor search procedure of searching divisors (HeightDivs[I], WidthDivs[J]) closest to the first block numbers (DHeight, DWidth) from among the computed divisors (WidthDivs, HeightDivs);

a block number check procedure of checking whether or not a product of the first block numbers (DHeight, DWidth) is greater than or equal to a maximum block number (MaxDB); and an adjacent divisor selection procedure of selecting divisors (HeightDivs[I±k], WidthDivs[J±k]) adjacent to the searched divisors (HeightDivs[I], WidthDivs[J]) if the product of the first block numbers (DHeight, DWidth) is greater than or equal to the maximum block number (MaxDB), wherein the block size determination procedure comprises:

determining second block numbers (RecH: RecHeight, RecW: RecWidth) in the height direction and the width direction of the screen by splitting the width and the height of the screen into numbers corresponding to the selected divisors; and a block size determination procedure of determining second block numbers (RecH: RecHeight, RecW: RecWidth) in a height direction and a width direction of the screen by splitting a width and a height of the screen into numbers corresponding to the searched divisors (HeightDivs[I], WidthDivs[J]).

6. The dynamic splitting method of claim 5, wherein the input information reception procedure comprises receiving information pertaining to the first block numbers (DHeight, DWidth), and the maximum block number (MaxDB) is determined as a product of the first block numbers (DHeight, DWidth).

7. The dynamic splitting method of claim 5, wherein the input information reception procedure comprises receiving information pertaining to the first block sizes (BH: BlockHeight, BW: BlockWidth), the first block numbers (DHeight, DWidth) are determined as ceil(SH/BS) and ceil(SW/BS), ceil( ) being a function for rounding up at a decimal point, and the maximum block number (MaxDB) is determined as a product of the first block numbers (DHeight, DWidth).

8. A dynamic splitting device for splitting a desktop screen into non-overlapping blocks of equal size, the dynamic splitting device comprising:

an interface configured to receive input information pertaining to a screen height (SH: ScreenHeight) and a screen width (SW: ScreenWidth) of a screen; and a control unit configured to compute a greatest common divisor (GCD) of the screen height (SH) and the screen width (SW) received from the interface, compute divisors (GCDdivs) of the GCD, and determine block numbers (RecH: RecHeight, RecW: RecWidth) in a height direction and a width direction of the screen by splitting a width and a height of the screen into blocks having a size equal to one of the divisors (GCDdivs), wherein the control unit applies an operation of a different constant or a different matrix on a first pixel information matrix for scaling or processing for each of the split blocks and applies an operation of a same constant or a same matrix on a second pixel information matrix for scaling or processing for pixels within each of the blocks, and the dynamic splitting device further comprises a display configured to show an image containing a pixel scaled or processed by the first and second pixel information matrices having the same or different constant or matrix operation applied thereto.

9. The dynamic splitting device of claim 8, wherein the interface further receives information pertaining to a maximum block number (MaxDB), and the control unit determines the block numbers (RecH, RecW) while incrementing an index (i) by a number of the divisors (GCDdivs), checks whether or not a total block number corresponding to a product of the block numbers (RecH, RecW) is greater than or equal to the maximum block number (MaxDB), and determines that the block numbers (RecH, RecW) determined above are to be returned if the total block number is smaller than the maximum block number (MaxDB).

10. The dynamic splitting device of claim 8, wherein the interface further receives information pertaining to a desired block size (BS), the control unit determines the block numbers (RecH, RecW) while incrementing an index (i) by a number of the divisors (GCDdivs) and checks whether or not a total block number corresponding to a product of the block numbers (RecH, RecW) is greater than or equal to a maximum block number (MaxDB), the maximum block number (MaxDB) determined as ceil(SH/BS) *ceil(SW/BS), ceil( ) being a function for rounding up at a decimal point, and if the total block number is smaller than the maximum block number (MaxDB), the control unit determines that the block numbers (RecH, RecW) determined above are to be returned.

11. A dynamic splitting device for splitting a desktop screen into non-overlapping blocks of equal size, the dynamic splitting device comprising:

an interface configured to receive input information pertaining to a screen height (SH: ScreenHeight), a screen width (SW: ScreenWidth), and first block numbers (DHeight, DWidth) or first block sizes (BH: BlockHeight, BW: BlockWidth) for a screen; and a control unit configured to compute divisors (WidthDivs, HeightDivs) for the screen height (SH) and the screen width (SW) received from the interface, search divisors (HeightDivs[I], WidthDivs[J]) closest to the first block numbers (DHeight, DWidth) from among the computed divisors (WidthDivs, HeightDivs), and determine second block numbers (RecH: RecHeight, RecW: RecWidth) in a height direction and a width direction of the screen by splitting a width and a height of the screen into numbers corresponding to the searched divisors (HeightDivs[I], WidthDivs[J]), wherein the control unit checks whether or not a product of the first block numbers (DHeight, DWidth) is greater than or equal to a maximum block number (MaxDB), and if the product of the first block numbers (DHeight, DWidth) is greater than or equal to the maximum block number (MaxDB), determines second block numbers (RecH: RecHeight, RecW: RecWidth) in the height direction and the width direction of the screen by selecting divisors (HeightDivs[I±k], WidthDivs[J±k]) adjacent to the searched divisors (HeightDivs[I], WidthDivs[J]) and splitting the width and the height of the screen into numbers corresponding to the selected divisors.

12. The dynamic splitting device of claim 11, wherein the interface receives information pertaining to the first block numbers (DHeight, DWidth), and the control unit determines the maximum block number (MaxDB) as a product of the first block numbers (DHeight, DWidth).

13. The dynamic splitting device of claim 11, wherein the interface receives information pertaining to the first block sizes (BH: BlockHeight, BW: BlockWidth), and the control unit determines the first block numbers (DHeight, DWidth) as ceil(SH/BS) and ceil(SW/BS) and determines the maximum block number (MaxDB) as a product of the first block numbers (DHeight, DWidth).

* * * * *